(12) United States Patent
Hirabayashi et al.

(10) Patent No.: US 7,967,454 B2
(45) Date of Patent: Jun. 28, 2011

(54) ELECTRO-OPTIC APPARATUS AND ELECTRONIC EQUIPMENT

(75) Inventors: Hidekazu Hirabayashi, Shiojiri (JP); Tomoaki Miyashita, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 101 days.

(21) Appl. No.: 12/233,984

(22) Filed: Sep. 19, 2008

(65) Prior Publication Data

US 2009/0080154 A1 Mar. 26, 2009

(30) Foreign Application Priority Data

Sep. 21, 2007 (JP) ................. 2007-245872

(51) Int. Cl.
*G03B 21/00* (2006.01)

(52) U.S. Cl. ............. 353/122; 353/31; 353/52; 353/56; 353/85; 353/87; 353/119; 349/5; 349/8; 349/33; 349/52; 349/58; 349/150; 349/60; 349/161; 361/748; 361/749; 361/750; 361/779; 174/250; 174/254; 174/260; 359/245; 359/254

(58) Field of Classification Search .............. 353/52, 353/56, 119, 122, 31, 85, 87; 349/33, 58, 349/5, 8, 60, 161, 52, 150; 359/245, 254; 361/748, 749, 750, 779; 174/250, 254, 260
See application file for complete search history.

(56) References Cited

U.S. PATENT DOCUMENTS

| | | | | |
|---|---|---|---|---|
| 4,963,001 A * | 10/1990 | Miyajima | | 349/5 |
| 5,032,021 A * | 7/1991 | Kanatani et al. | | 353/54 |
| 5,146,354 A * | 9/1992 | Plesinger | | 349/59 |
| 5,499,129 A * | 3/1996 | Satou et al. | | 349/58 |
| 5,668,700 A * | 9/1997 | Tagusa et al. | | 361/779 |
| 5,677,746 A * | 10/1997 | Yano | | 349/58 |
| 5,742,366 A * | 4/1998 | Imoto | | 349/62 |
| 6,411,353 B1 * | 6/2002 | Yarita et al. | | 349/59 |
| 6,741,301 B2 * | 5/2004 | Tsuji | | 349/58 |
| 6,806,920 B2 * | 10/2004 | Hayashi et al. | | 349/58 |
| 7,098,972 B2 * | 8/2006 | Saitoh et al. | | 349/58 |
| 7,365,821 B2 * | 4/2008 | Dewa et al. | | 349/161 |
| 7,545,459 B2 * | 6/2009 | Fujiwara et al. | | 349/58 |
| 7,625,091 B2 * | 12/2009 | Fujinawa et al. | | 353/52 |
| 7,808,573 B2 * | 10/2010 | Chen et al. | | 349/58 |
| 2002/0048152 A1 | 4/2002 | Kurihara et al. | | |
| 2004/0145052 A1 | 7/2004 | Ueno et al. | | |
| 2004/0169784 A1 * | 9/2004 | Miyashita et al. | | 349/58 |
| 2005/0286228 A1 | 12/2005 | Kim | | |
| 2006/0066771 A1 * | 3/2006 | Hayano et al. | | 349/58 |
| 2006/0109394 A1 * | 5/2006 | Miyagawa et al. | | 349/58 |
| 2006/0274252 A1 | 12/2006 | Son | | |
| 2007/0002256 A1 * | 1/2007 | Kim | | 349/150 |

FOREIGN PATENT DOCUMENTS

| | | |
|---|---|---|
| JP | 2002-366046 | 12/2002 |
| JP | 2003-015104 | 1/2003 |
| JP | 2004-242331 | 9/2004 |
| JP | 2005-077810 | 3/2005 |
| JP | 2005-310957 | 11/2005 |
| JP | 2006-064939 | 3/2006 |
| JP | 2006-301256 | 11/2006 |

* cited by examiner

*Primary Examiner* — Georgia Y Epps
*Assistant Examiner* — Sultan Chowdhury
(74) *Attorney, Agent, or Firm* — Maschoff Gilmore & Israelsen (57) ABSTRACT

An electro-optic apparatus includes an electro-optic panel, a wiring board, and an integrated circuit unit. The integrated circuit unit including a heat radiating member arranged so as to overlap at least partly with the integrated circuit unit.

11 Claims, 9 Drawing Sheets

ELECTRO-OPTIC APPARATUS AND ELECTRONIC EQUIPMENT

BACKGROUND

1. Technical Field

The present invention relates to an electro-optic apparatus such as a liquid crystal device, an electro-optic apparatus mounting case for mounting the electro-optic apparatus, and electronic equipment such as a liquid crystal projector provided with the electro-optic apparatus and, more specifically, to a technological field relating to a heat radiating member for radiating heat of an integrated circuit provided on a flexible substrate used for the liquid crystal device.

2. Related Art

When the electro-optic apparatus of this type is used as a light valve in electric equipment such as a liquid crystal projector, for example, a strong light source beam from a light source enters an electro-optic panel such as a liquid crystal panel which performs an electro-optical operation such as a display operation in a pixel area of the electro-optic apparatus, for example. Accordingly, the electro-optic panel is likely to rise in temperature, which lowers a performance of the electro-optic panel. Therefore, in order to improve a heat-radiating property of the electro-optic panel, for example, technologies to employ a metal case for storing the electro-optic panel and form a fin on a surface of the case, or to improve coefficient of thermal conductivity by filling adhesive agent into all the clearances formed between the electro-optic panel and the case are proposed (see JP-A-2003-15104, JP-A-2002-366046).

On the other hand, a technology to provide at least part of a drive circuit for controllably driving the electro-optic panel outside the electro-optic panel as an integrated circuit chip, and connect the electro-optic panel and the integrated circuit chip using a flexible substrate for the purpose of downsizing of the electro-optic panel or widening of the pixel area with respect to the size of the electro-optic panel is also proposed by the applicant of the present application (see JP-A-2004-252331).

However, in the integrated circuit chip described above, power consumption increases in association with improvement of the throughput, and calorific power due to this operation increases. Therefore, there arises a technological problem such that the electro-optic apparatus is likely to be subjected to thermal runaway or thermal rupture due to the heat generated by the integrated circuit chip. In contrast, according to the technology described in JP-A-2003-15104 and JP-A-2002-366046, there is a technological problem such that it is not suitable at least for heat radiation of the integrated circuit chip.

SUMMARY

An advantage of some aspects of the invention is that there is provided an electro-optic apparatus which is able to radiate heat generated by an integrated circuit chip efficiently and an electro-optic apparatus mounting case and electronic equipment.

An electro-optic apparatus according to a first aspect of the invention includes: an electro-optic panel for performing an electro-optical operation; a wiring board including a plurality of signal lines electrically connected to the electro-optic panel; an integrated circuit unit provided on the wiring board and electrically connected to at least part of the plurality of signal lines, the integrated circuit unit including at least part of a drive circuit for driving the electro-optic panel; and a heat radiating member arranged so as to overlap at least partly with the integrated circuit unit on the wiring board in plan view for radiating heat of the integrated circuit unit.

In this arrangement, the electro-optic apparatus includes the wiring board such as, a flexible substrate or the like for example, including the electro-optic panel such as a liquid crystal panel, the integrated circuit unit including at least part of the drive circuit for driving the electro-optic panel and the plurality of signal lines for electrically connecting the electro-optic panel and the integrated circuit unit. For example, the integrated circuit unit which is an IC (Integrated Circuit) chip is electrically and mechanically secured to the wiring board using, for example, TAB (Tape Automated Bonding) technology. When it is operated, the electro-optic panel is driven by the integrated circuit unit or the like, and the electro-optical operation such as a display operation in a pixel area on the electro-optic panel is performed. The term "pixel area" here does not mean individual pixel areas, but means an entire area in which a plurality of pixels are arranged in a plane and, typically, it corresponds to an "image display area" or a "display area".

The heat radiating member is arranged so as to overlap at least partly with the integrated circuit unit on the wiring board in plan view. The heat radiating member may be arranged on the wiring board on the side where the integrated circuit unit is provided or may be arranged on the wiring board on the opposite side from the side where the integrated circuit unit is provided. When the heat radiating member is arranged on the wiring board on the side where the integrated circuit unit is provided, heat of the integrated circuit unit is transferred to the heat radiating member directly or via adhesive agent or the like which bonds the integrated circuit unit and the heat radiating member to each other. When the heat radiating member is arranged on the wiring board on the opposite side from the side where the integrated circuit unit is provided, the heat of the integrated circuit unit is transferred to the heat radiating member via the wiring board and the adhesive agent or the like which bonds the wiring board and the heat radiating member to each other. Efficiency of heat radiation is improved by forming the heat radiating member of a metal having high coefficient of thermal conductivity such as copper or aluminum, and the heat of a laminated circuit unit is efficiently radiated.

According to the study of the inventors of this application, the drive circuit included in the integrated circuit unit is generally becoming complicated and developed by a demand of high definition of display images. In addition, degree of integration of the integrated circuit unit is improved by a demand of downsizing of the electro-optic apparatus. Therefore, cooling of the integrated circuit unit is insufficient with a natural convection of air or a forced convection by a fan, and it is turned out that the electro-optic apparatus is likely subjected to thermal runaway or thermal rupture due to the heat generated by the integrated circuit unit.

Therefore, according to the first aspect of the invention, the heat of the integrated circuit unit is radiated by the heat radiating member arranged so as to be overlapped at least partly with the integrated circuit unit in plan view. By widening a surface area of the heat radiating member as large as possible when the heat radiating member is arranged on the wiring board on the side opposite from the side where the integrated circuit unit is provided, the surface area which contributes to radiate the heat of the integrated circuit is increased. In addition, a bonding surface area is increased, and hence separation of the heat radiating member is prevented. In contrast, in a case in which the heat radiating member is arranged on the wiring board on the side where the integrated circuit unit is provided, for example, by forming the heat radiating member integrally with a storage case for storing the electro-optic panel, increase in the surface area of the heat radiating member is achieved while reducing a load by the weight of the heat radiating member with respect to the integrated circuit unit.

Furthermore, when a fin or the like is formed on the heat radiating member, the heat radiating surface area is increased and a good airflow is ensured, whereby the heat of the integrated circuit unit is efficiently radiated. In addition, by bonding the heat radiating member to the integrated circuit unit or the wiring board by the adhesive agent containing metal particles, the heat of the integrated circuit unit is efficiently transferred to the heat radiating member.

As a result, according to the electro-optic apparatus in the invention, efficient heat radiation of the integrated circuit unit is achieved, and the thermal runaway or the thermal rupture of the electro-optic apparatus is prevented. Furthermore, in the case in which the heat radiating member is arranged on the wiring board on the opposite side from the side where the integrated circuit unit is provided, the heat radiating member functions also as a lining member. Therefore, electrical disconnection between the integrated circuit unit and the signal lines (more specifically, separation of terminal unit of an IC chip from the wiring board) in the electro-optic apparatus caused by mechanical stresses applied from the outside when the electro-optic apparatus is mounted such that the wiring board is bent is prevented.

Preferably, the storage case for storing the electro-optic panel, and the heat radiating member is formed integrally with the storage case is further provided.

In this arrangement, the heat radiating member is typically formed integrally with the storage case so as to extend from the storage case by the same material as the storage case. Therefore, the load due to the weight of the heat radiating member applied to the integrated circuit unit or the wiring board is reduced, and the separation of the heat radiating member is prevented. In addition, since arrangement of the heat radiating member is achieved without increasing the number of steps in manufacture of the electro-optic apparatus, it is very advantageous from a practical standpoint. Furthermore, the heat from the integrated circuit unit is radiated not only into the air but also to the storage case by the heat radiating member. Therefore, radiation of the heat generated at the integrated circuit unit is achieved using a heat radiating function of the storage case. For example, since an air-cooling fan is directed to the storage case and the storage case is provided with the heat-radiating fin, it has a high heat-radiating property. By utilizing a surplus capacity of the heat-radiating property or by enhancing its heat-radiating property, the configuration in the invention is further advantageous.

Even though the heat radiating member is not formed integrally with the storage case, the same effects are obtained also when the heat radiating member is fixed or mounted mechanically firmly to the storage case and, specifically, when it is fixed or mounted in a manner superior in thermal conductivity, radiation of the heat generated at the integrated circuit unit is achieved using the heat-radiating property of the storage case.

Preferably, a bonded part which bonds the integrated circuit unit and the heat radiating member to each other is further provided.

In this arrangement, for example, the bonded part formed, for example, of a silicon-based mold agent bonds the integrated circuit unit and the heat radiating member to each other. Assuming that the integrated circuit unit and the heat radiating member are bonded to each other by double-face adhesive tape or the like, a contact surface is reduced by fine irregularity on the surface of the heat radiating member or the like, so that the heat radiating effect is lowered. Therefore, in the invention, since the bonded part is deformed corresponding to the fine irregularity on the surface of the heat radiating member or the like, reduction in contact surface is prevented. Furthermore, since the heat of the integrated circuit unit is transferred to the heat radiating member only via the bonded part, the heat of the integrated circuit unit is radiated further efficiently.

Preferably, the wiring board is arranged between the integrated circuit unit and the heat radiating member.

In this arrangement, the wiring board is arranged between the integrated circuit unit and the heat radiating member. In other words, the heat radiating member is arranged on the wiring board on the opposite side from the side where the integrated circuit unit is provided. In this case, the heat of the integrated circuit unit is transferred to the heat radiating member at least via the wiring board, so that the heat is radiated.

In this arrangement, specifically, the heat radiating member functions also as the lining member, and hence the electrical disconnection between the integrated circuit unit and the signal lines caused by the mechanical stresses applied from the outside when the electro-optic apparatus is mounted such that the wiring board is bent is prevented, which is vary advantageous from a practical standpoint. When a capacitor or the like is provided on the wiring board, the heat radiating member may be arranged so as to overlap with the integrated circuit unit, the capacitor and the like on the wiring board in plan view. Accordingly, the electrical disconnection between the capacitor and the signal lines is prevented.

Preferably, a bonded part for bonding the heat radiating member and the wiring board is further provided.

In this arrangement, the heat radiating member and the wiring board are bonded to each other by the bonded part formed, for example, of the silicon-based mold agent, so that the reduction of the contact surface due to the fine irregularity on the surface of the heat radiating member is prevented.

Preferably, the heat radiating member includes an opening extending along the direction intersecting the direction of extension of the plurality of signal lines.

In this arrangement, even though the heat radiating member is formed integrally with the storage case or is firmly fixed or mounted to the storage case, transfer of the heat of the electro-optic panel to the integrated circuit unit via the storage case and the heat radiating member is prevented, or transfer of the heat of the integrated circuit unit to the electro-optic panel is restrained. The opening is typically formed between the electro-optic panel and the integrated circuit unit on the wiring board in plan view. By forming the opening at a position as close to the electro-optic panel as possible, the surface area of the heat radiating member which mainly contributes to the radiation of the heat of the integrated circuit unit is increased. The number of openings is not limited to one, and a plurality of the openings may be formed.

Preferably, the heat radiating member includes the fin for heat radiation.

In this arrangement, the heat radiating surface area is increased and the good airflow is achieved by the fin, so that the heat of the integrated circuit unit is efficiently radiated. The fin may be provided over the entire surface of the heat radiating member or may be provided in a part. The fin may be formed as a separate member from the heat radiating member, or may be formed integrally with the heat radiating member. When the fin is formed as a separate member, the size or the position of the fin is flexibly changed without reforming the entire storage case according to the electronic equipment provided with the electro-optic apparatus, so that lowering of the flexibility of arrangement in the electronic equipment is avoided, which is very advantageous from a practical standpoint.

Preferably, the fin is formed integrally with the heat radiating member.

In this arrangement, the coefficient of thermal conductivity between the heat radiating member and the fin is improved in comparison with the case in which the fin is formed as a separate member. Furthermore, the heat radiating member and the fin may be manufactured in the same step, so that increase in manufacturing cost is restrained.

According to a second aspect of the invention, an electro-optic mounting case for storing an electro-optic apparatus including an electro-optic panel for performing an electro-optical operation, a wiring board including a plurality of signal lines electrically connected to the electro-optic panel; an integrated circuit unit provided on the wiring board and electrically connected to at least part of the plurality of signal lines, the integrated circuit unit including at least part of a drive circuit for driving the electro-optic panel; includes a heat radiating member arranged so as to overlap at least partly with the integrated circuit unit on the wiring board in plan view for radiating heat of the integrated circuit unit and a storage case for storing the electro-optic panel, in which the heat radiating member is formed integrally with the storage case.

In this arrangement, for example, the electro-optic apparatus mounting case stores the electro-optic apparatus provided with the electro-optic panel such as a liquid crystal panel, the integrated circuit unit including at least part of the drive circuit for driving the electro-optic panel and the wiring board such as a flexible substrate which includes the signal lines for electrically connecting the electro-optic panel and the integrated circuit unit.

The storage case stores the electro-optic panel. The heat radiating member extends from the storage case along the direction in which the signal lines included in the wiring board extend, and is arranged so as to overlap at least partly with the integrated circuit unit on the wiring board in plan view. By increasing a surface area of the heat radiating member and bonding the heat radiating member and the integrated circuit unit or the wiring board with respect to each other by using a material having high coefficient of thermal conductivity such as a mold agent containing, for example, metal particles, the heat of the integrated circuit unit is efficiently radiated. In addition, since the heat radiating member is formed integrally with the storage case, a load applied to the integrated circuit unit or the wiring board due to the weight of the heat radiating member is reduced, and separation of the heat radiating member is prevented. In addition, since arrangement of the heat radiating member is achieved without increasing the number of steps in manufacture of the electro-optic apparatus, it is very advantageous from a practical standpoint. Furthermore, the heat from the integrated circuit unit is radiated not only into the air but also to the storage case. Therefore, radiation of the heat generated at the integrated circuit unit is achieved using a heat radiating function of the storage case by the heat-radiating member.

Electronic equipment according to a third aspect of the invention includes the electro-optic apparatus described above (including the various modes thereof).

According to the electronic equipment in the third aspect of the invention, since the electro-optic apparatus described above is provided, the heat of the integrated circuit unit is efficiently radiated. Therefore, probability of occurrence of the thermal runaway or the thermal rupture is reduced, and hence various types of highly reliable electronic equipment such as projecting-type display devices, mobile phones, electronic databooks, word processors, view finder type or direct-view type video tape recorders, workstations, TV-phones, POS terminals, touch panels, and so on are realized.

BRIEF DESCRIPTION OF THE DRAWINGS

The invention will be described with reference to the accompanying drawings, wherein like numbers reference like elements.

DESCRIPTION OF EXEMPLARY EMBODIMENTS

Advantages and other benefits of the invention will be apparent from the description of the exemplary embodiments shown below.

Referring now to the drawings, embodiments of the invention will be described below. In the embodiments shown below, a liquid crystal device of a TFT (Thin Film Transistor) active matrix drive system will be described as an example of an electro-optic apparatus in the invention.

First Embodiment

Referring now to FIG. 1 to FIG. 6, a first embodiment of the electro-optic apparatus in the invention will be described. The scales of the respective layers and members are different from the actual scale throughout the drawings in order to make these layers and members recognizable in the drawings.

Figure 1:
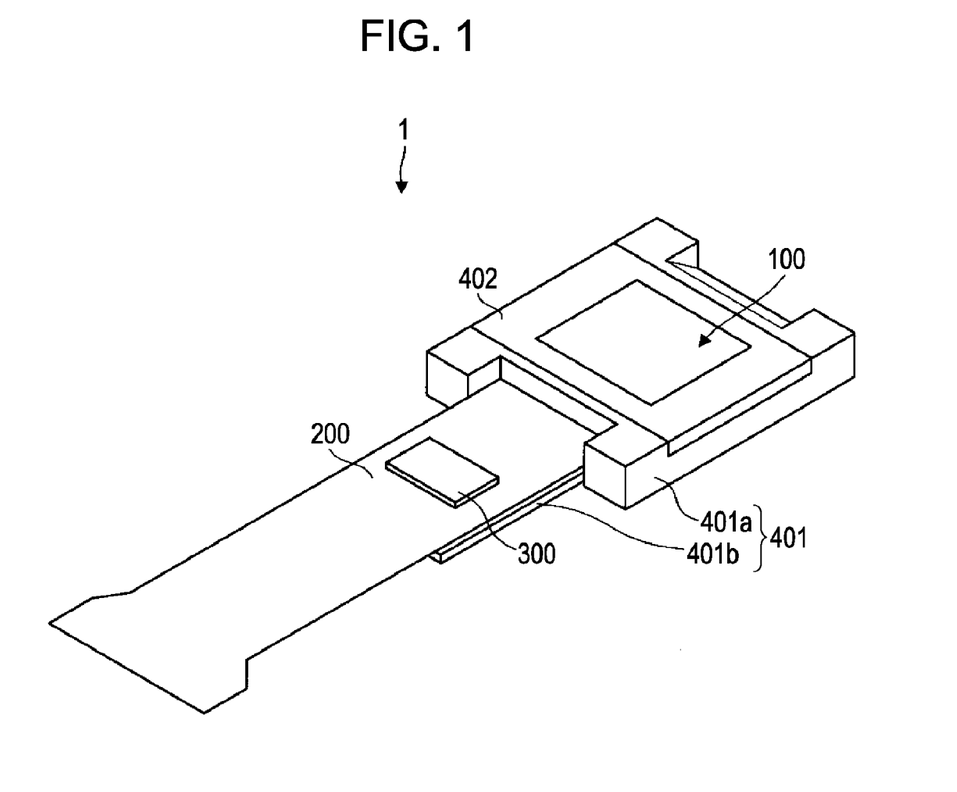
FIG. 1 is a perspective view of a liquid crystal device according to a first embodiment.

First of all, referring now to the drawings, a general configuration of a liquid crystal device in the first embodiment will be described. FIG. 1 is a perspective view of the liquid crystal device according to the first embodiment.

In FIG. 1, a liquid crystal device 1 includes a liquid crystal panel 100, a wiring board 200 including a plurality of signal lines electrically connected to the liquid crystal panel 100, and a drive IC chip 300 provided on the wiring board 200 and electrically connected to at least part of the plurality of signal lines, and including at least part of a drive circuit for driving the liquid crystal panel 100. The drive IC chip 300 includes, for example, part of a data line drive circuit, not shown, and is secured electrically and mechanically to the wiring board 200 using TAB (Tape Automated Bonding) technology. The wiring board 200 is formed by patterning the signal lines or the like on a base material formed of polyimide or the like. The liquid crystal panel 100 and the drive IC chip 300 correspond to an electro-optic panel and an integrated circuit unit in the invention, respectively.

The liquid crystal panel 100 is stored in a storage case, which corresponds to an electro-optic apparatus mounting case in the invention, including a frame 401 and a hook 402. The frame 401 includes a body portion 401a for storing the liquid crystal panel 100 and a heat radiating portion 401b for radiating heat of the drive IC chip 300. In other words, the heat radiating portion 401b is formed integrally with the storage case for storing the liquid crystal panel 100. The body portion 401a and the heat radiating portion 401b correspond to the storage case and a heat radiating member in the invention, respectively. The frame 401 is formed of metal having high coefficient of thermal conductivity such as aluminum.

Figure 2:
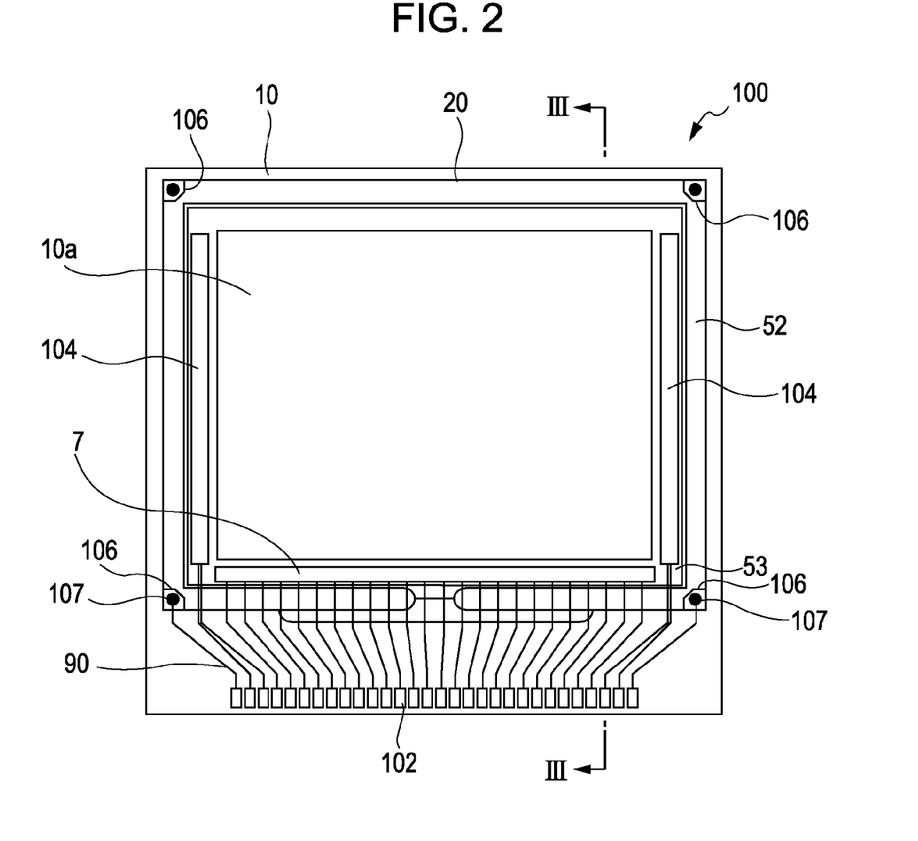
FIG. 2 is a plan view showing a general configuration of a liquid crystal panel according to the first embodiment.
Figure 3:
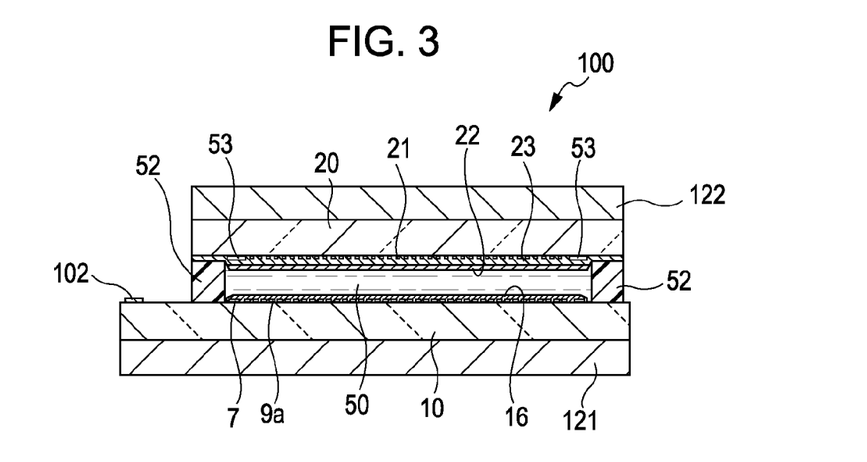
FIG. 3 is a cross-sectional view taken along the line III-III in FIG. 2.

Referring now to FIG. 2 and FIG. 3, description of the liquid crystal panel 100 will be added. FIG. 2 is a plan view of a TFT array substrate together with respective components formed thereon viewed from a side of an opposed substrate, and FIG. 3 is a cross-sectional view taken along the line III-III in FIG. 2.

In FIG. 2 and FIG. 3, the liquid crystal panel 100 in the first embodiment includes a TFT array substrate 10 and an opposed substrate 20. The TFT array substrate 10 is formed of a transparent substrate such as a quartz substrate, a glass substrate, or a silicon substrate, and the opposed substrate 20 is formed of a transparent substrate such as a quartz substrate or a glass substrate. A liquid crystal layer 50 is encapsulated between the TFT array substrate 10 and the opposed substrate 20, and the TFT array substrate 10 and the opposed substrate 20 are bonded to each other by a sealing member 52 provided in a sealing area which is located around an image display area 10a as an example of a "pixel area", which corresponds to an area in which a plurality of pixels are provided.

The sealing member 52 is formed, for example, of UV-cured resin, heat-cured resin, or UV/heat-cured resin for bonding the both substrates to each other, which is applied on the TFT array substrate 10 in the manufacturing process, and is cured by being irradiated with an ultraviolet ray or by being heated. The sealing member 52 contains gap material such as glass fibers or glass beads dispersed therein for adjusting a distance (that is, gap) between the TFT array substrate 10 and the opposed substrate 20 to a predetermined value. The gap material may be arranged in the image display area 10a or in a peripheral area around the image display area 10a in addition to, or instead of those mixed in the sealing member 52.

In FIG. 2, a frame light-shielding film 53 having a light-shielding property which defines a frame area of the image display area 10a is provided on the side of the opposed substrate 20 in parallel to the inside of the sealing area where the sealing member 52 is arranged. However, part or the entire part of the frame light-shielding film 53 may be provided on the side of the TFT array substrate 10 as an integrated light-shielding film.

An external circuit connecting terminal 102 is provided in part of the peripheral area located outside the sealing area where the sealing member 52 is arranged along one side of the TFT array substrate 10. A sampling circuit 7 is provided inside the sealing area along the one side so as to be covered with the frame light-shielding film 53. A scanning line drive circuit 104 is provided inside the sealing areas along two sides adjacent to the one side so as to be covered with the frame light-shielding film 53.

Upper and lower substrates conducting terminals 106 are provided on the TFT array substrate 10 in areas opposing four corners of the opposed substrate 20 for connecting the both substrates via upper and lower substrates conductors 107. In this arrangement, electrically conducting state is achieved between the TFT array substrate 10 and the opposed substrate 20. A drawn wiring 90 for electrically connecting the external circuit connecting terminal 102, the scanning line drive circuit 104 and the upper and lower substrates conducting terminals 106 is formed on the TFT array substrate 10.

In FIG. 3, a laminated structure including wiring such as a pixel switching TFT, scanning lines and data lines as driving elements integrated therein is formed on the TFT array substrate 10. Although a detailed configuration of the laminated structure is omitted in FIG. 3, pixel electrodes 9a formed of transparent material such as ITO (Indium Tin Oxide) or the like are formed in an island shape in a predetermined pattern on a pixel-to-pixel basis.

The pixel electrode 9a is formed on the image display area 10a on the TFT array substrate 10 so as to oppose an opposed electrode 21 described later. An alignment film 16 is formed on the surface of the TFT array substrate 10 which faces the liquid crystal layer 50, that is, on the pixel electrode 9a, so as to cover the pixel electrode 9a.

A light-shielding film 23 is formed on the surface of the opposed substrate 20 which opposes the TFT array substrate 10. The light-shielding film 23 is formed in a grid-shape in plan view on the opposed surface of the opposed substrate 20. On the opposed substrate 20, non-aperture areas are defined by the light-shielding film 23, and areas partitioned by the light-shielding film 23 correspond to aperture areas which allow transmission of light emitted from a projector lamp or a direct-view backlight. It is also possible to form the light-shielding film 23 in a stripe pattern to define the non-aperture areas by the light-shielding film 23 and respective components such as data lines provided on the side of the TFT array substrate 10.

The opposed electrodes 21 formed of transparent material such as ITO are formed on the light-shielding film 23 so as to oppose the plurality of pixel electrodes 9a. It is also possible to form a color filter, not shown in FIG. 3, on the light-shielding film 23 in an area including part of the aperture area and the non-aperture area for performing color display in the image display area 10a. An alignment film 22 is formed on the opposed electrodes 21 on an opposed surface of the opposed substrate 20.

Liquid crystal which constitutes the liquid crystal layer 50 modulates light by the change of alignment and order of an aggregation of molecules depending on the voltage level to be applied and is able to display tones. In normally white mode, coefficient of transmission with respect to incident light decreases in accordance with the voltage applied on the pixelto-pixel basis. In normally black mode, the coefficient of transmission with respect to the incident light increases with the voltage applied on the pixel-to-pixel basis. Therefore, light having a contrast according to an image signal is generally emitted from the liquid crystal device.

As shown in FIG. 3, a dust-proof substrate 121 and a dust-proof substrate 122 are arranged respectively on a lower layer side of the TFT array substrate 10 and an upper layer side of the opposed substrate 20.

On the TFT array substrate 10 shown in FIG. 2 and FIG. 3, a pre-charge circuit for supplying pre-charge signals of a predetermined voltage level to a plurality of data lines prior to the image signals and an inspection circuit for inspecting the quality and defects of the liquid crystal device during manufacture or at the time of shipment may be provided in addition to the scanning line drive circuit 104 and the sampling circuit 7. In FIG. 2, a data line drive circuit portion and an image signal supply circuit, which correspond to the circuits relating to the supply of the image signals except for the sampling circuit 7 are not formed on the TFT array substrate 10. In other words, the data line drive circuit portion is integrated exclusively in the drive IC chip 300. However, part of the data line drive circuit portion as such may be provided in the peripheral area between the external circuit connecting terminal 102 and the sealing member 52 on the TFT array substrate 10 (that is, on the side of the sampling circuit 7 via the sealing member 52 along the lower side in FIG. 2).

Figure 4:
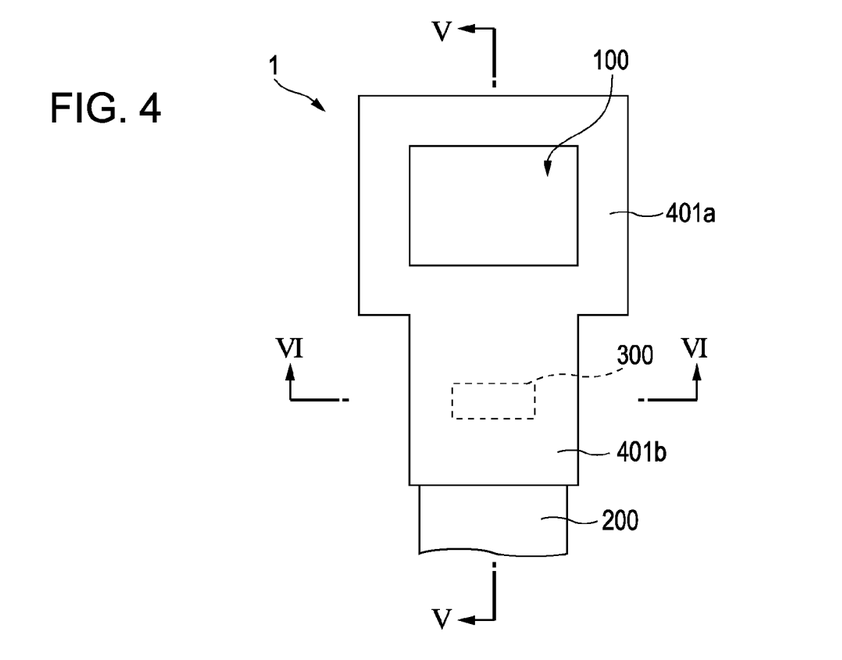
FIG. 4 is a plan view showing a general configuration of the liquid crystal device according to the first embodiment.
Figure 5:
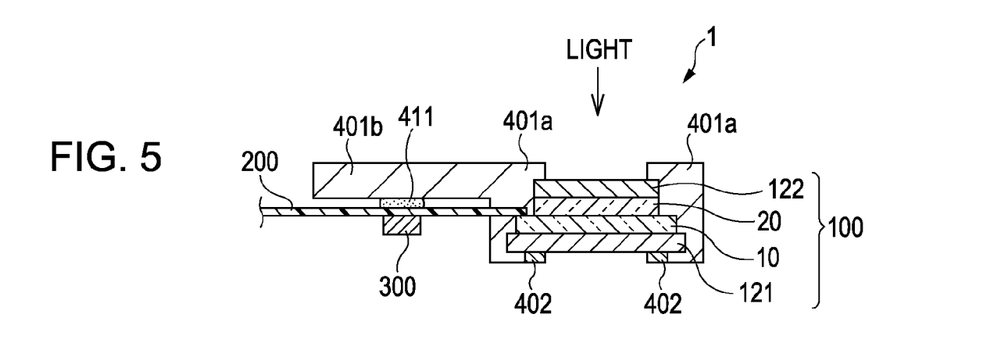
FIG. 5 is a cross-sectional view taken along the line V-V in FIG. 4.
Figure 6:
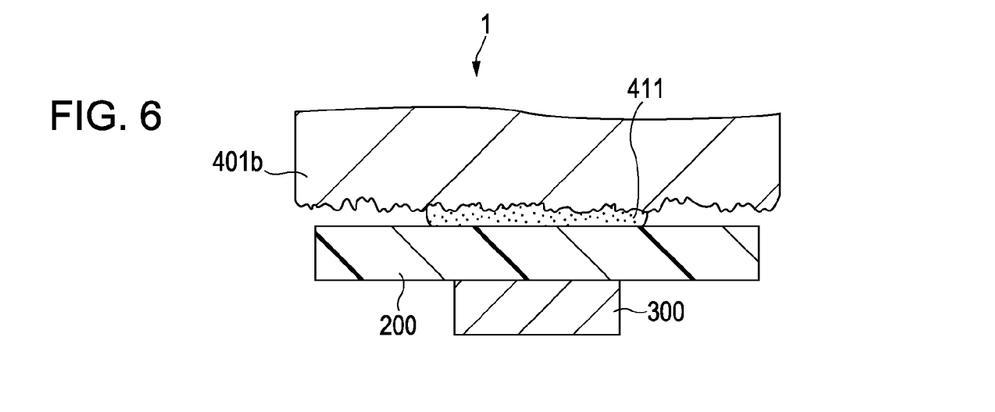
FIG. 6 is a cross-sectional view taken along the line VI-VI in FIG. 4.

Referring now to FIG. 4 to FIG. 6, the description of the liquid crystal device 1 is added. FIG. 4 is a plan view of the liquid crystal device in the first embodiment viewed from the side of the opposed substrate; FIG. 5 is a cross-sectional view taken along the line V-V; and FIG. 6 is an enlarged cross-sectional view taken along the line VI-VI in FIG. 4. In these drawings, components of the liquid crystal panel 100 shown in FIG. 2 and FIG. 3 are omitted as needed for the convenience of description. In FIG. 6, the irregularity of the surface of the heat radiating portion 401b is exaggerated for the convenience of description.

As shown in FIG. 5, the liquid crystal panel 100 is electrically connected to the wiring board 200 via the external circuit connecting terminal 102 (see FIG. 2). The drive IC chip 300 is secured on the wiring board 200, and the drive IC chip 300 is electrically connected to the liquid crystal panel 100 via at least part of the plurality of signal lines formed on the wiring board 200. The liquid crystal panel 100 is driven by the drive IC chip 300, the scanning line drive circuit 104, the sampling circuit 7 or the like (see FIG. 2) and a display operation on the image display area 10a (see FIG. 2) is achieved.

When manufacturing the liquid crystal device 1, the liquid crystal panel 100 is stored in the body portion 401a of the frame 401, and then the hook 402 is mounted. When storing the liquid crystal panel 100 in the body portion 401a, the liquid crystal panel 100 and the body portion 401a are bonded to each other, for example, by a silicon-based mold agent, and the wiring board 200 and the heat radiating portion 401b are bonded to each other by a bonding portion 411 formed, for example, of a silicon-based mold agent. It is also possible to enhance the coefficient of thermal conductivity by mixing, for example, metal particles in the mold agent. The bonding portion 411 may be formed entirely on the portion in which the wiring board 200 and the heat radiating portion 401b are overlapped with each other in plan view.

Part of heat generated by the drive IC chip 300 is transferred to the heat radiating portion 401b via the wiring board 200 and the bonding portion 411, and is radiated to the air from the heat radiating portion 401b. On the other hand, part of heat of the liquid crystal panel 100 is transferred to the body portion 401a, and is radiated to the air from the body portion 401a. In this manner, the body portion 401a of the frame 401 contributes mainly to radiation of the liquid crystal panel 100 and the heat radiating portion 401b contributes mainly to radiation of the drive IC chip 300. In particular, the heat radiating portion 401b has a larger surface area than the drive IC chip 300 as shown in FIG. 4, and is formed of metal having high coefficient of thermal conductivity, such as aluminum. Therefore, the heat of the drive IC chip 300 is radiated efficiently.

As shown in FIG. 6, the surface of the heat radiating portion 401b opposing the wiring board 200 includes fine irregularity existing on the surface thereof. Therefore, if the heat radiating portion 401b and the wiring board 200 are bonded to each other by double-face adhesive tape or the like, a contact surface of the heat radiating portion 401b is reduced. Therefore, in this embodiment, since the heat radiating portion 401b and the wiring board 200 are bonded to each other by the bonding portion 411 formed, for example, of the silicon-based mold agent, the contact surface of the heat radiating portion 401b is not reduced. On the contrary, the contact surface between these components may be increased by the mold agent entering the irregular surface, and hence the heat conductivity is further improved. Therefore, the heat of the drive IC chip 300 is efficiently transferred to the heat radiating portion 401b.

Consequently, according to the liquid crystal device 1 in the first embodiment, the heat of the drive IC chip 300 is efficiently radiated, and the thermal runaway and the thermal rupture of the liquid crystal device 1 are prevented. In addition, even when the mechanical stress such as bending is applied to the wiring board 200, since the wiring board 200 and the heat radiating portion 401b are adhered to each other, and hence separation of the drive IC chip 300 from the wiring board 200 is prevented. Furthermore, since the heat radiating portion 401b is formed as part of the frame 401, the load applied to the wiring board 200 due to the weight of the heat radiating portion 401b is reduced.

First Modification

Figure 7:
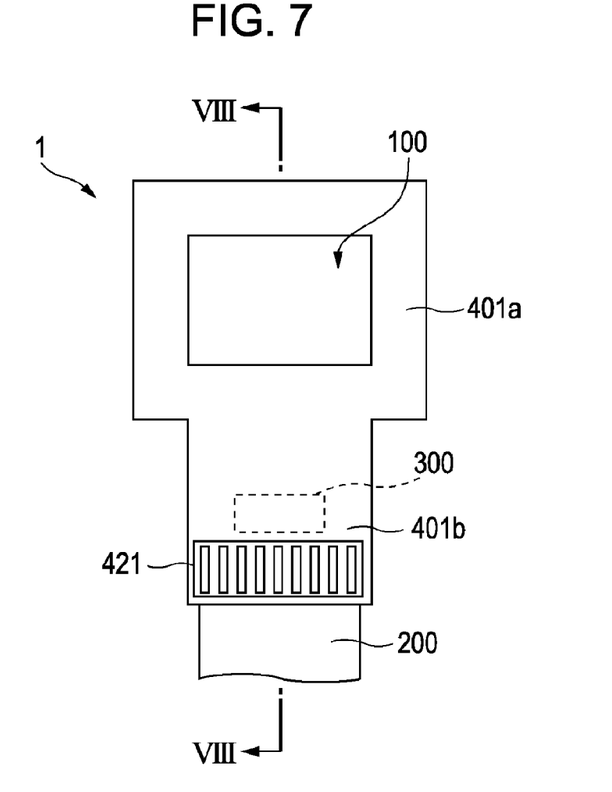
FIG. 7 is a plan view showing a general configuration of the liquid crystal device according to a first modification of the first embodiment.
Figure 8:
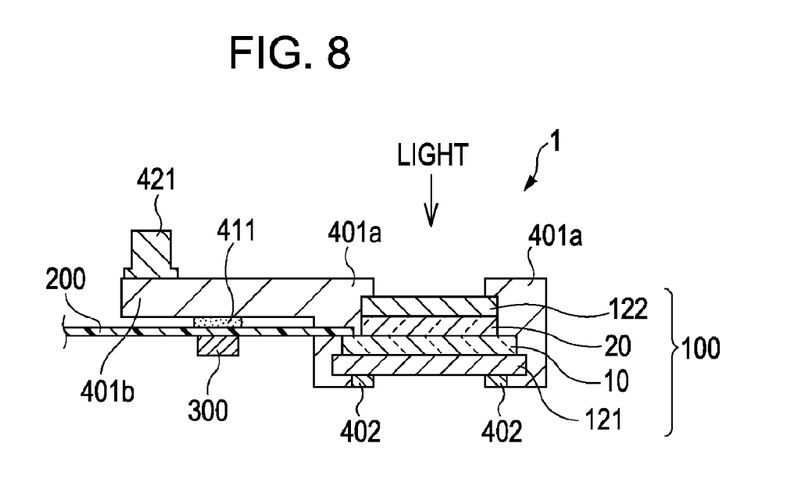
FIG. 8 is a cross-sectional view taken along the line VIII-VIII in FIG. 7.

Referring now to FIG. 7 and FIG. 8, a first modification of the electro-optic apparatus according to the first embodiment will be described. FIG. 7 is a plan view of a liquid crystal device according to the first modification when viewed from the side of the opposed substrate, which is similar to FIG. 4, and FIG. 8 is a cross-sectional view taken along the line VIII-VIII in FIG. 7.

As shown in FIG. 7 and FIG. 8, a radiation fin 421 is arranged on the heat radiating portion 401b. Typically, the radiation fin 421 and the heat radiating portion 401b are bonded to each other by the mold agent or the like. The radiation fin 421 is formed of metal having high coefficient of heat conductivity such as aluminum, for example. The material to form the radiation fin 421 and the material to from the frame 401 may either be different or the same.

With the provision of the radiation fin 421, the surface area which contributes to the radiation is increased, and the good airflow is achieved, so that the heat of the drive IC chip 300 is radiated more efficiently.

Although the lateral cross-section of the fin is substantially square in FIG. 7 and FIG. 8, it may be formed into an oval shape or in a stream line according to the airflow at a position where the electro-optic apparatus is mounted.

Second Modification

Figure 9:
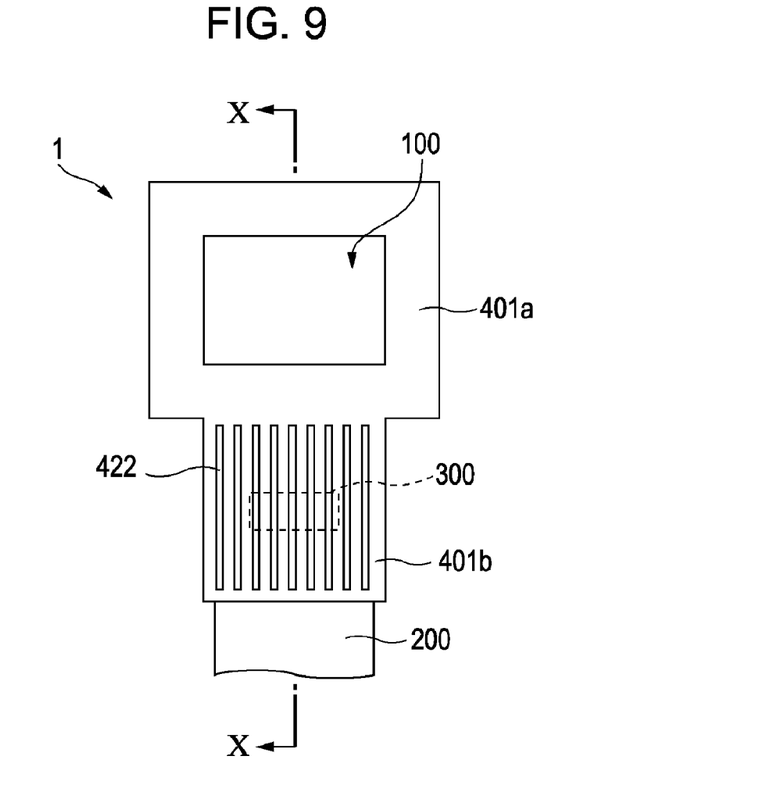
FIG. 9 is a plan view showing a general configuration of the liquid crystal device according to a second modification of the first embodiment.
Figure 10:
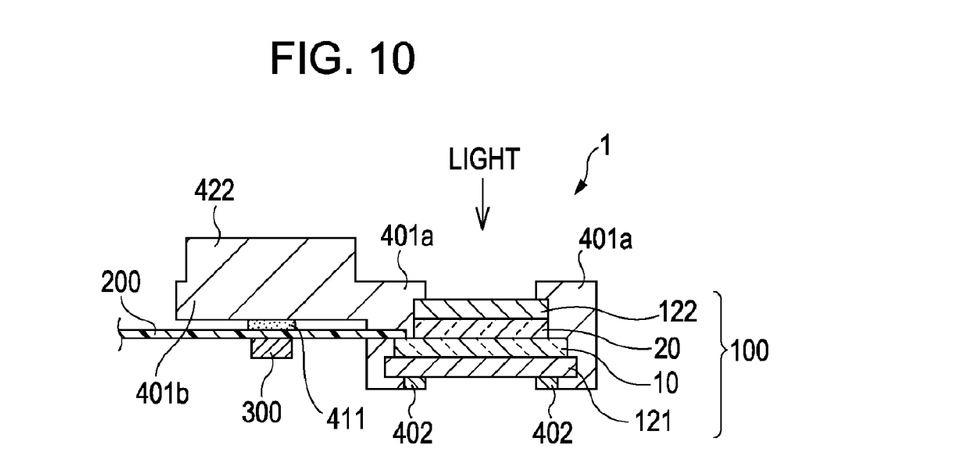
FIG. 10 is a cross-sectional view taken along the line X-X in FIG. 9.

Referring now to FIG. 9 and FIG. 10, a second modification of the electro-optic apparatus according to the first embodiment will be described. FIG. 9 is a plan view of a liquid crystal device according to the second modification when viewed from the side of the opposite substrate, which is similar to FIG. 4, and FIG. 10 is a cross-sectional view taken along the line X-X in FIG. 9.

Figure 11:
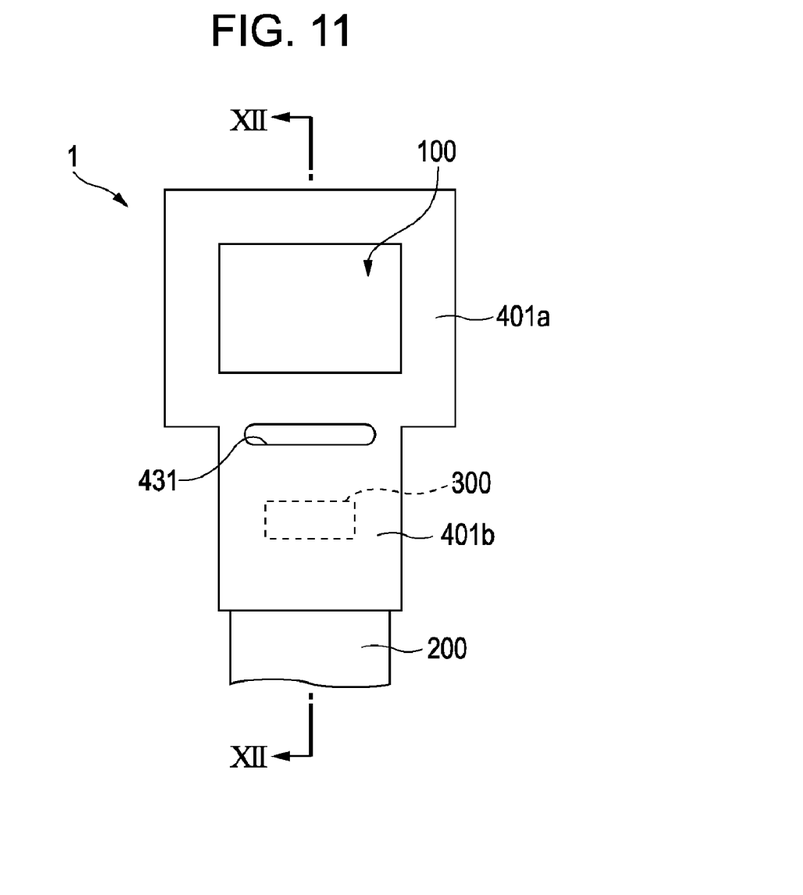
FIG. 11 is a plan view showing a general configuration of the liquid crystal device according to a third modification in the first embodiment.

As shown in FIG. 9 and FIG. 10, a radiation fin 422 is formed on the heat radiating portion 401b. In other words, the radiation fin 422 is formed integrally with the heat radiating portion 401b. Accordingly, the heat is easily transferred between the heat radiating portion 401b and the radiation fin 422. In addition, since the heat radiating portion 401b and the radiation fin 422 (and the body portion 401a as well) may be manufactured simultaneously, increase in number of steps in manufacture is prevented.
Third Modification Referring now to FIG. 11 and FIG. 12, a third modification of the electro-optic apparatus according to the first embodiment will be described. FIG. 11 is a plan view of a liquid crystal device according to the third modification when viewed from the side of the opposed substrate, which is similar to FIG. 4, and FIG. 12 is a cross-sectional view taken along the line XII-XII in FIG. 11.

Figure 12:
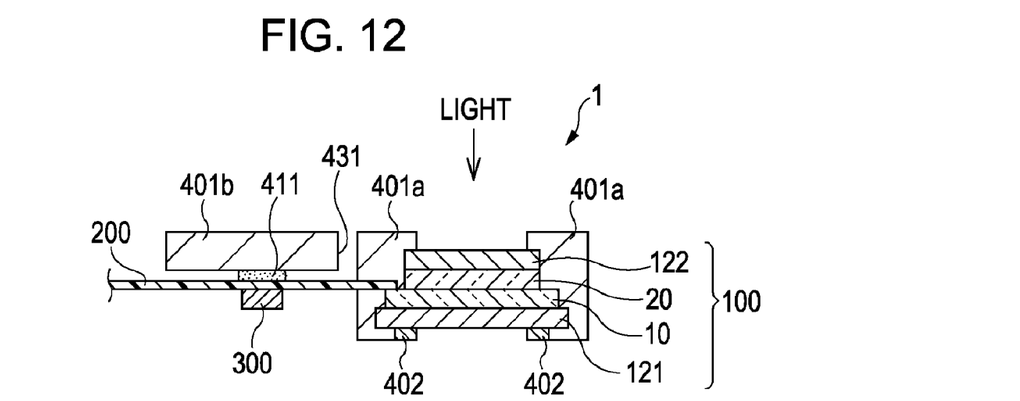
FIG. 12 is a cross-sectional view taken along the line XII-XII in FIG. 11.

As shown in FIG. 11 and FIG. 12, the heat radiating portion 401b is formed with an opening 431 along the direction intersecting the direction in which the plurality of signal lines included in the wiring board 200 extend (vertical direction in FIG. 11) (laterally in FIG. 11). Accordingly, the heat is hardly transferred between the heat radiating portion 401b and the body portion 401a. Therefore, the drive IC chip 300 is restrained from being affected by the heat of the liquid crystal panel 100 transferred thereto via the frame 401, or the liquid crystal panel 100 is restrained from being affected by the heat of the drive IC chip 300 transferred thereto via the frame 401.

Figure 13:
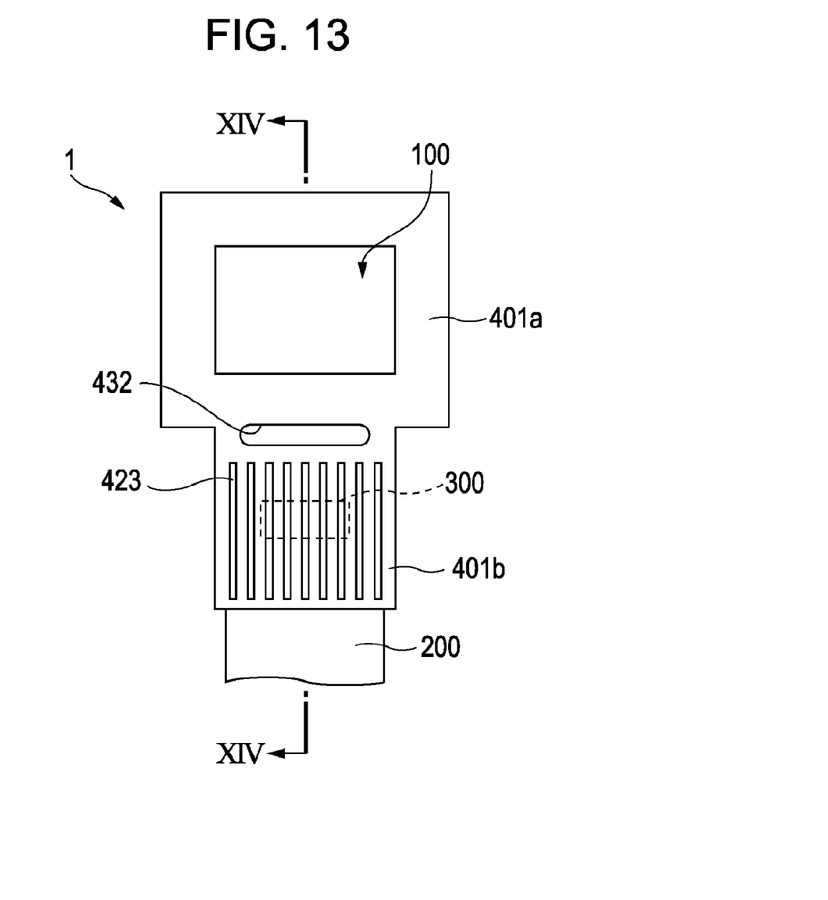
FIG. 13 is a plan view showing a general configuration of the liquid crystal device according to a fourth modification of the first embodiment.

When part of heat radiation by the heat radiating portion 401b is carried out by using the heat-radiating property of the body portion 401a, the thermal conductivity therebetween may be enhanced by not providing the opening 431.
Fourth Modification Referring now to FIG. 13 and FIG. 14, a fourth modification of the electro-optic apparatus according to the first embodiment will be described. FIG. 13 is a plan view of a liquid crystal device according to the fourth modification when viewed from the side of the opposed substrate, which is similar to FIG. 4, and FIG. 14 is a cross-sectional view taken along the line XIV-XIV in FIG. 13.

Figure 14:
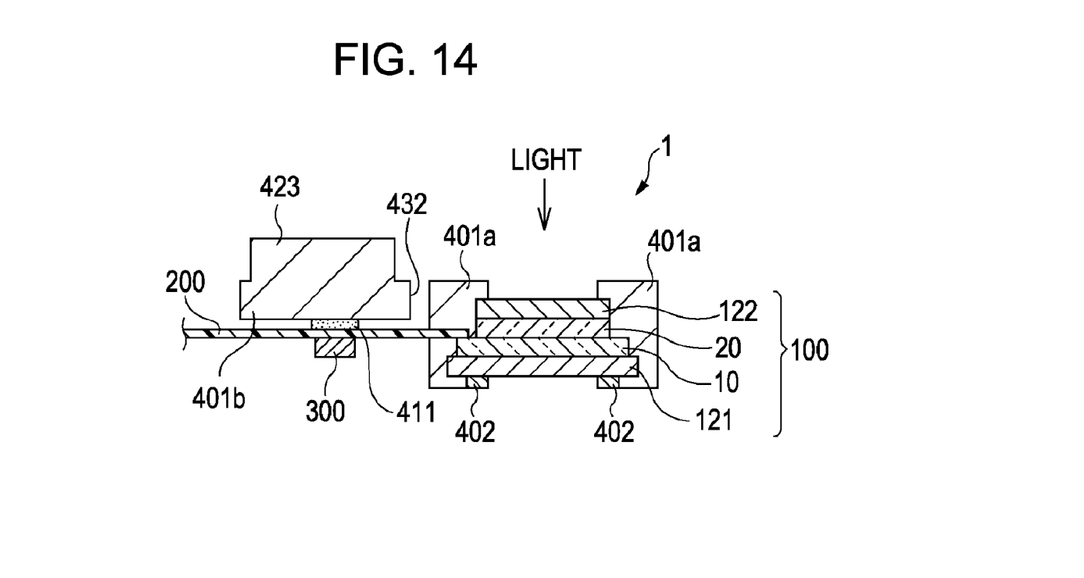
FIG. 14 is a cross-sectional view taken along the line XIV-XIV in FIG. 13.

As shown in FIG. 13 and FIG. 14, the heat radiating portion 401b is formed with a radiation fin 423 and an opening 432. Accordingly, the heat of the drive IC chip 300 is efficiently radiated, and one of the drive IC chip 300 and the liquid crystal panel 100 is restrained from being affected by the heat transferred from the other one of those.

Second Embodiment

Figure 15:
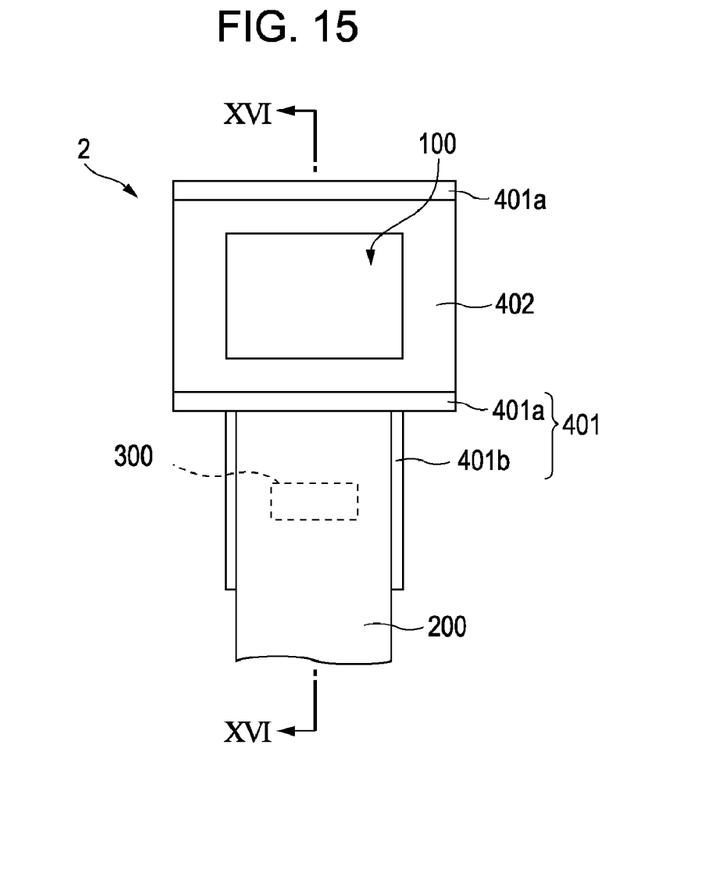
FIG. 15 is a plan view showing a general configuration of a liquid crystal device according to a second embodiment.
Figure 16:
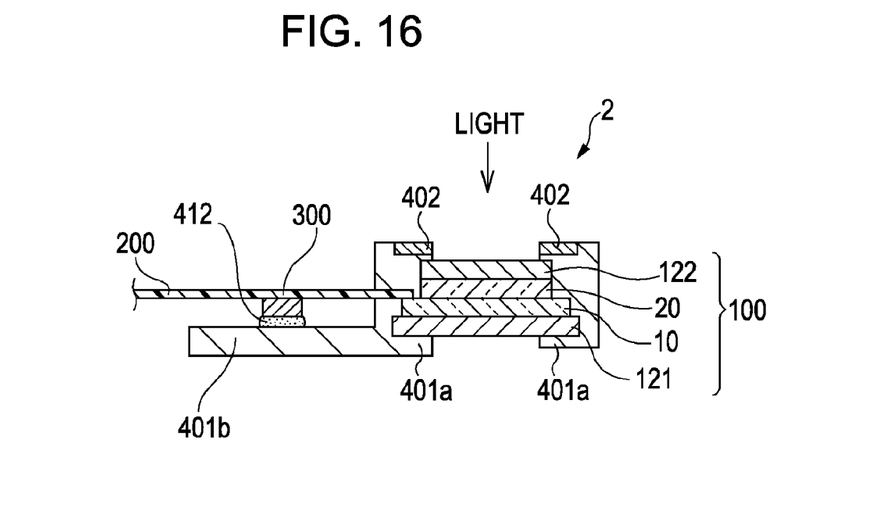
FIG. 16 is a cross-sectional view taken along the line XVI-XVI in FIG. 15.

Referring now to FIG. 15 an FIG. 16, a second embodiment of the electro-optic apparatus in the invention will be described. FIG. 15 is a plan view of a liquid crystal device according to the second embodiment when viewed from the side of the opposed substrate, which is similar to FIG. 4, and FIG. 16 is a cross-sectional view taken along the line XVI-XVI in FIG. 15. In the second embodiment, the configuration is the same as the first embodiment except that the heat radiation portion and the drive IC chip are bonded to each other by a bonded part. Therefore, description which is overlapped with the first embodiment is omitted here, and common parts in the drawings are designated by the same reference numerals, and only basically different points are described on the basis of FIG. 15 and FIG. 16.

Figure 17:
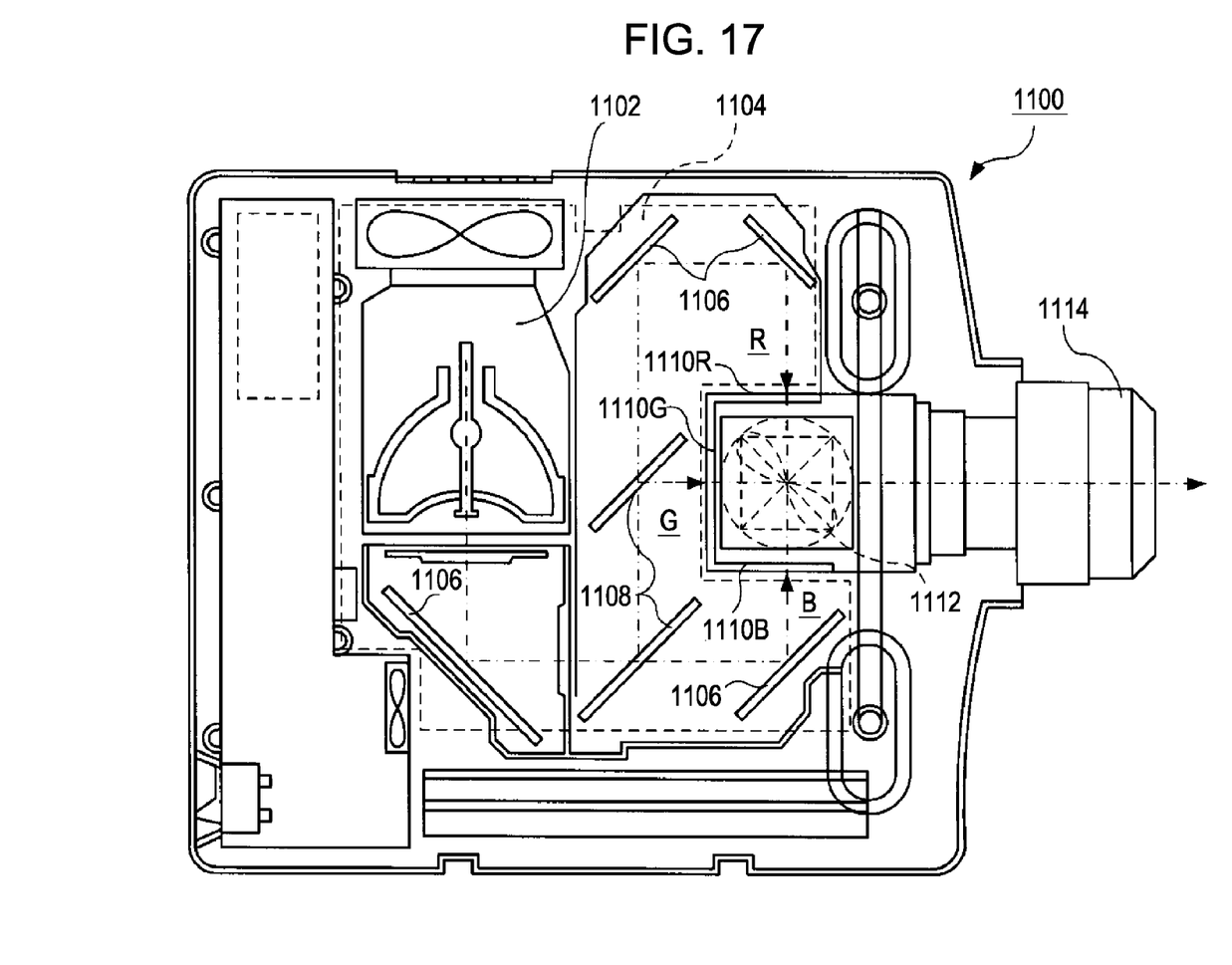
FIG. 17 is a plan view showing a configuration of a projector as an example of electronic equipment to which an electro-optic apparatus is applied.

As shown in FIG. 16, the liquid crystal panel 100 in a liquid crystal device 2 is stored in the body portion 401a of the frame 401 so that the hook 402 is arranged on the side of the opposed substrate 20 of the liquid crystal panel. For example, the drive IC chip 300 and the heat radiating portion 401b of the frame 401 are bonded to each other by a bonding portion 412 formed of a silicon-based mold agent. Accordingly, the heat of the drive IC chip 300 is efficiently transferred to the heat radiating portion 401b to radiate the heat.
Electronic Equipment Referring now to FIG. 17, a case in which the liquid crystal device described above is applied to a projector which corresponds to electronic equipment will be described. The liquid crystal panel 100 in the liquid crystal device described above is used as a light valve of the projector. FIG. 17 is a plan view showing a configuration of the projector.

As shown in FIG. 17, a lamp unit 1102 formed of a white light source such as a halogen lamp or the like is provided in an interior of a projector 1100. A projection light emitted from the lamp unit 1102 is split into three primaries of R, G and B by four mirrors 1106 and two dichroic mirrors 1108 arranged in a light guide 1104 and enters into liquid crystal panels 1110R, 1110B and 1110G as the light valves for the respective primaries.

The configurations of the liquid crystal panels 1110R, 1110B and 1110G are the same as the liquid crystal device described above, and are driven by primary signals of R, G and B supplied from an image signal processing circuit. The light beams modulated by these liquid crystal panels enter a dichroic prism 1112 from three directions. In the dichroic prism 1112, the light beams of R and B are refracted by 90° and the light beam of G advances straight ahead. Therefore, images of the respective colors are combined, and hence a color image is projected on a screen or the like via a projection lens 1114.

When keeping an attention to the images displayed respectively by the liquid crystal panels 1110R, 1110B and 1110G, the images displayed by the liquid crystal panels 1110R and 1110B need to be inverted with respect to the image displayed by the liquid crystal panel 1110G.

Since light beams corresponding to the respective primaries R, G and B enter the respective liquid crystal panels 1110R, 1110B and 1110G by the dichroic mirror 1108, it is not necessary to provide a color filter.

In addition to the electronic equipment described on the basis of FIG. 17, mobile-type personal computers, mobile phones, liquid crystal TV sets, view finder type or direct-view type video tape recorders, car navigation apparatuses, pagers, electronic databooks, electronic calculators, word processors, workstations, TV phones, POS terminals, apparatuses having a touch panel are exemplified. Needless to say, the invention is applicable to these types of electronic equipment.

The invention is also applicable to reflective liquid crystal devices (LCOS) formed with elements on a silicon substrate, plasma displays (PDP), field emission displays (FED, SED), organic EL displays, digital micro-mirror devices (DMD), electrophoresis devices in addition to the liquid crystal devices described in the embodiments shown above.

The invention is not limited to the embodiments shown above, and may be modified as needed without departing the scope and spirit of the invention understood from the appended claims and the entire specification, and the electro-optic apparatus, the electro-optic apparatus mounting case and the electronic equipment including the electro-optic apparatus associated with these modifications are also included in the technical field of the invention.

What is claimed is:

1. An electro-optic apparatus comprising:
an electro-optic panel including an external connecting terminal;
a wiring board which is formed separately from the electro-optic panel and is disposed adjacent to the electro-optic panel, the wiring board including a signal line, the signal line being electrically connected to the electro-optic panel via the external connecting terminal;
an integrated circuit unit provided on a first surface of the wiring board, the integrated circuit unit being electrically connected to the signal line;
a heat radiating member arranged adjacent to a second surface of the wiring board which is opposite to the first surface so as to overlap at least partly with the integrated circuit unit in plan view;
a bonding portion formed between the wiring board and the heat radiating portion so as to transfer heat generated by the integrated circuit to the heat radiating portion via the wiring board and the bonding portion; and
a case for storing the electro-optic panel,
wherein the heat radiating member is integrally formed with the case.

2. The electro-optic apparatus according to claim 1, further comprising: a bonded part which bonds the integrated circuit unit and the heat radiating member to each other.

3. The electro-optic apparatus according to claim 1, wherein
the wiring board is arranged between the integrated circuit unit and the heat radiating member.

4. The electro-optic apparatus according to claim 3, further comprising: a bonded part for bonding the heart radiating member and the wiring board.

5. The electro-optic apparatus according to claim 1, wherein
the heat radiating member includes an opening extending along the direction intersecting the direction of extension of the signal line.

6. The electro-optic apparatus according to claim 1, wherein
the heat radiating member includes a fin for heat radiation.

7. The electro-optic apparatus according to claim 6, wherein
the fin is formed integrally with the heat radiating member.

8. Electronic equipment comprising the electro-optic apparatus according to claim 1.

9. An electro-optic apparatus comprising:
an electro-optic panel including an external connecting terminal;
a wiring board including a signal line, the signal line being electrically connected to the external connecting terminal of the electro-optic panel;
an integrated circuit unit provided on the wiring board, the integrated circuit unit being electrically connected to the signal line; and
a case accommodating the electro-optic panel, the case including:
a body portion accommodating the electro-optic panel; and
a heat radiating member integrally formed with the body portion and protruding from the body portion so as to overlap with the wiring board, the heat radiating member being overlapped with the integrated circuit unit and including an opening at a position between the body portion and the integrated circuit unit in plan view.

10. The electro-optic apparatus according to claim 9, wherein the heat radiating member includes a fin for heat radiation.

11. The electro-optic apparatus according to claim 9, wherein the integrated circuit unit provided on a first surface of the wiring board and the heat radiating member arranged adjacent to a second surface of the wiring board which is opposite to the first surface.

* * * * *